United States Patent [19]

King

[11] 4,199,427
[45] Apr. 22, 1980

[54] ELECTROLYTIC TREATER

[76] Inventor: Arthur S. King, 8021 Cherokee La., Leawood, Kans. 66206

[21] Appl. No.: 972,931

[22] Filed: Dec. 26, 1978

[51] Int. Cl.² ............................................. C25B 9/00
[52] U.S. Cl. ................................................. 204/263
[58] Field of Search ............................... 204/263, 269

[56] References Cited

U.S. PATENT DOCUMENTS

| | | | |
|---|---|---|---|
| 3,287,250 | 11/1966 | Broun, Jr. et al. | 204/263 |
| 3,574,084 | 4/1971 | Bruce | 204/263 |
| 3,907,654 | 9/1975 | Radd et al. | 204/263 |
| 3,936,364 | 2/1976 | Middle | 204/269 |
| 4,107,006 | 8/1978 | Winand | 204/263 |

*Primary Examiner*—R. L. Andrews
*Attorney, Agent, or Firm*—Schmidt, Johnson, Hovey & Williams

[57] ABSTRACT

In the electrolytic treatment of a liquid so as to encourage flocculation of solid particles suspended within the liquid, it is desirable to prevent particles which have received electrodic action at one electrode from being exposed to the oppositely charged electrode of the system. Hence, the system utilizes a pair of separate chambers that are each provided with an electrode forming either the anode or the cathode of the system, depending upon the charge applied by a source of direct electrical potential. The two chambers are interconnected in liquid communication so as to complete an electric circuit, and each has its own effluent outlet which can be opened and closed independently of the other outlet. While incoming liquid can flow to either of the chambers, if the liquid is predominantly one charge, the outlet from the chamber having the electrode of the same charge as the incoming liquid is closed or at least substantially restricted whereby at least most of the flow is through that chamber having the electrode charged oppositely of the dominant charge in the incoming liquid. Because the outlet of the disabled chamber is controlled rather than the inlet thereof, the two chambers remain in liquid communication with one another so as to maintain the electric circuit and thereby continue electrolytic action, notwithstanding the fact that particles exposed to the electrode in the open chamber are at least substantially kept from exposure to the electrode of the controlled chamber.

6 Claims, 1 Drawing Figure

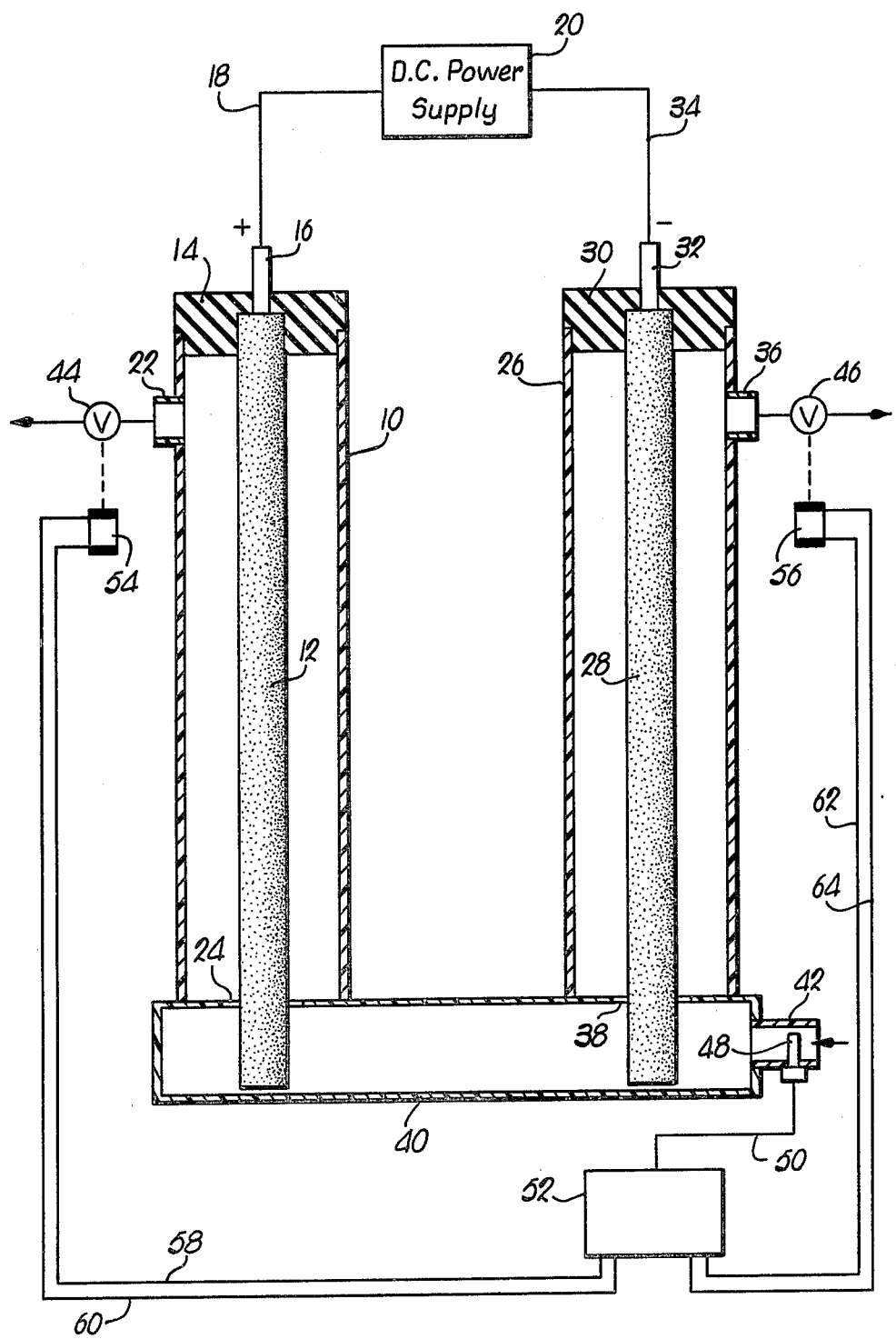

ELECTROLYTIC TREATER

TECHNICAL FIELD

This invention relates to fluid treatment by electrodic action such as, for example, the treatment of waste waters with electricity so as to encourage the flocculation and subsequent precipitation of solids suspended within such waste water.

BACKGROUND ART

It is known that treating waste waters containing suspended solids electrolytrically so that the water is exposed to a pair of oppositely charged, bare electrodes has the effect of neutralizing the waste particles so as to encourage them to flocculate and settle out. Positively charged particles migrate to the negatively charged electrode while negatively charged particles travel to the positively charged electrode. Once the charged particles have been subjected to the reactions taking place at the electrodes, the particles more readily combine with one another so as to separate from the liquid in which they are suspended.

SUMMARY OF THE INVENTION

It has been found that, for a variety of reasons, it is desirable to keep particles which have received electrodic action at one electrode from subsequently being exposed to the oppositely charged eletrode. Accordingly, pursuant to the present invention, eletrolytic treatment is obtained using two separate chambers containing two separate, oppositely charged electrodes and interconnected by a common liquid conduit that will complete the electric circuit notwithstanding physical separation of the electrodes in two different chambers. Each chamber has an outlet that is controllable independently of the other so that, if the incoming liquid to the system is predominantly one charge, the outlet for the chamber having the similarly charged electrode may be closed or at least severely restricted, causing the incoming liquid to be mainly directed to the chamber having the electrode that is charged oppositely from the dominant charge of the incoming liquid. By keeping the outlet of the operating chamber open, a constant flow through the desired chamber results, and particles acted on by the operating chamber are quickly directed out of the same without the opportunity to travel along and be acted upon the electrode of the other chamber. If desired, equipment for monitoring the pH level of the liquid coming into the system may be utilized to control the valves associated with the outlets of the two chambers so that automatic operation of such valves is obtained according to the dominant charges existing in the incoming liquid.

BRIEF DESCRIPTION OF THE DRAWING

The single drawing FIGURE is a schematic diagram of a system constructed in accordance with the principles of the present invention.

DETAILED DESCRIPTION

A cylindrical chamber 10 of dielectric material is disposed in upright condition and contains an electrode 12 located concentrically within the chamber 10. An insulated cap 14 at the upper end of the chamber 10 holds the electrode 12 centered within chamber 10, and a terminal 16 on the electrode 12 projects upwardly through and beyond the cap 14 where it is connected to the positive lead 18 of a source of direct electrical potential 20. An outlet 22 is disposed in the chamber 10 adjacent the top of the latter, and an inlet 24 is disposed in the chamber 10 adjacent the bottom of the latter.

A second chamber 26 of cylindrical configuration contains an electrode 28 concentrically within the same and supported in such concentric relationship via a cap of dielectric material 30 at the upper end of the chamber 26. As with the chamber 10, the chamber 26 is preferably of dielectric material, and the terminal 32 of the electrode 28 projects upwardly through and beyond the cap 30 where it is connected to the negative lead 34 from the source of electrical potential 20. An outlet 36 in the chamber 26 is disposed adjacent the upper end of the latter, while an inlet 38 to the chamber 26 is adjacent the lower end of the latter.

The two chambers 10 and 26 have their inlets 24 and 38 respectively interconnected by a manifold 40 which maintains the two chambers 10 and 26 in liquid communication with one another. A tube 42 leads into and intersects the manifold 40 for introducing incoming liquid to be treated into the manifold 40 and subsequently the chambers 10 and 26.

The outlets 22 and 36 of the chambers 10 and 26 respectively are independently openable and closeable with respect to each other by way of valves 44 and 46, each of which may be manually operated if desired. One aspect of the present invention, however, involves the automatic operation of such valves 44 and 46 depending upon the acidity or alkalinity of the liquid entering the system via tube 42. Accordingly, the tube 42 may be provided with a probe 48 to detect the pH of the incoming liquid within tube 42. The probe 48 is connected via line 50 to a pH monitoring device 52 which is capable of sending electrical impulses to solenoids 54 and 56 controlling the valves 44 and 46 respectively, the solenoid 54 being connected to the monitoring device 52 via lines 58 and 60 while the solenoid 56 is connected to the monitoring device 52 via the lines 62 and 64. The device 52 is so arranged that if the incoming liquid detected by the probe 48 is predominantly acidic so as to have a dominance of positively charged particles, the monitoring device 52, operating through the solenoid 54, at least partially closes the valve 44 and opens the valve 46. On the other hand, if the incoming liquid is detected by the probe 48 to be primarily basic so as to carry a dominance of negatively charged particles, the monitoring device 52 causes the solenoid 56 to at least partially close valve 46 and causes the solenoid 54 to open the valve 44.

OPERATION

If the liquid entering the system through the tube 42 is predominantly alkaline, for example, it will carry an excess of negatively charged particles. In order to reduce the negative charges on such particles, they must be exposed to the positive electrode 12 associated with chamber 10. Only in this way can the negatively charged particles give up electrons at the electrode 12 so as to more readily combine with one another to form floc. Thus, rather than direct such liquid through both chambers 10 and 26 simultaneously, once they have both been filled, the outlet 36 of the chamber 26 is at least partially closed by the valve 46; the valve 44 associated with outlet 22 of chamber 10 remains open, however. Thus, while a body of the liquid remains within the chamber 26 and the conduit 40, the flow is at least partially through the chamber 10 and along th electrode 12 so that the negatively charged particles carried by the incoming liquid are directed along the electrode 12 so as to make the necessary electronic change. As they leave the outlet 22, they may be directed to a suitable settling tank or clarifying basin where final separation is allowed to occur.

Note that using this technique, the negatively charged particles, once having been acted upon by the electrode 12, are effectively isolated from the negatively charged electrode 28 and thus have little opportunity to once again increase their negative charges. Yet, the manifold 40 interconnecting the two chambers 10 and 26 completes the electric circuit whose other components are the electrode 12, the terminal 16, the lead 18, the power supply 20, the lead 34, the terminal 32 and the electrode 28.

If, on the other hand, the incoming liquid through the tube 42 is predominantly acidic so as to carry a dominance of positively charged particles, it is desirable for the outlet 22 of chamber 10 to be at least partially closed while the outlet 36 of the chamber 26 is opened. Once both chambers 10 and 26 are full, making this type of changes in the outlets 22 and 36 results in flow at least mainly through the chamber 26 without disrupting the electrical connection between the latter and the chamber 10 via the liquid-filled conduit 40. Hence, the positively charged particles of the liquid are carried along the negatively charged electrode 28 to pick up electrons from the latter, thereby encouraging flocculation and ultimate settling out of the particles.

If desired, the opening and closing of the outlets 22 and 36 may be affected automatically using the pH monitoring device 52 as above described. If such a procedure is followed, the operative steps are the same as above discussed and with substantially the same benefits.

Note that the restricted nature of the inlets 24 and 38 relative to the interiors of chambers 10 and 26 is helpful in keeping floc which has formed within chambers 10 and 26 from gravitating into the manifold 40.

I claim:

1. Apparatus for treating a liquid having electrolytic properties, said apparatus including:

a pair of separate chambers each having an electrode therein;

means for connecting said electrodes across a source of electrical potential;

conduit means interconnecting said chambers for liquid communication therebetween and the completion of an electric circuit when said liquid is contained within said conduit means and said chambers in contact with said electrodes;

an effluent outlet for each of said chambers respectively;

a supply means coupled with said chambers for introducing said liquid into the same and for exposing solids suspended within said liquid to the electrodes; and means for selectively closing down said outlet of either chamber independently of the other without disrupting said liquid communication between the chambers so as to maintain said electric circuit intact and yet keep solids acted upon by the chamber with the open outlet from migrating to the chamber with the closed down outlet.

2. Apparatus as claimed in claim 1, wherein said chambers are disposed in upright positions and said means for connecting the chambers in liquid communication with one another are disposed adjacent the bottoms of the chambers, said outlets being adjacent the tops of the chambers and said supply means being the bottoms of the chambers.

3. Apparatus as claimed in claim 2, wherein each of said chambers is provided with an inlet, said means for connecting the chambers in liquid communication with one another including a manifold extending between said inlets, said supply means being coupled in liquid communication with said manifold.

4. Apparatus as claimed in claim 3, means associated with said supply means for monitoring the pH of said liquid; and means operably coupled with said monitoring means for effecting said closing down of one or the other of said outlets depending upon the pH of said liquid as determined by said monitoring means.

5. Apparatus as claimed in claim 1, wherein each of said chambers is provided with an inlet, said means for connecting the chambers in liquid communication with one another including a manifold extending between said inlets, said supply means being coupled in liquid communication with said manifold.

6. Apparatus as claimed in claim 1, wherein each of said electrodes is disposed in an upright disposition, each of said chambers having an electrolyte inlet receiving the lower end of the corresponding electrode and serving as a restriction to the egress of flocculated materials therefrom.

* * * * *